United States Patent
Smakman et al.

(10) Patent No.: US 7,200,479 B2
(45) Date of Patent: Apr. 3, 2007

(54) METHOD FOR GUIDING A MULTITRACK VEHICLE ON A CURVED PATH

(75) Inventors: Hendrikus Smakman, Munich (DE); Ottmar-Ralf Orend, Schwabach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 108 days.

(21) Appl. No.: 11/052,117

(22) Filed: Feb. 8, 2005

(65) Prior Publication Data

US 2005/0137772 A1 Jun. 23, 2005

Related U.S. Application Data

(63) Continuation of application No. PCT/EP03/07309, filed on Jul. 8, 2003.

(30) Foreign Application Priority Data

Aug. 9, 2002 (DE) .............................. 102 36 734

(51) Int. Cl.
*G06F 7/70* (2006.01)
(52) U.S. Cl. ............... 701/70; 701/72; 701/83
(58) Field of Classification Search ........... 701/41, 701/42, 70–75, 78, 81, 82, 83, 91; 180/408, 180/412, 413, 415, 197; 303/140, 146
See application file for complete search history.

(56) References Cited

U.S. PATENT DOCUMENTS 5,864,769 A * 1/1999 Inagaki et al. ................ 701/70
5,882,092 A * 3/1999 Koibuchi .................... 303/146
6,056,371 A    5/2000 Lin et al.
6,131,688 A   10/2000 Fukada
6,865,468 B2 * 3/2005 Lin et al. .................... 701/70
6,909,957 B2 * 6/2005 Suissa ......................... 701/82
6,925,371 B2 * 8/2005 Yasui et al. .................. 701/72

FOREIGN PATENT DOCUMENTS

DE    42 18 034 A1    12/1993

(Continued)

*Primary Examiner*—Richard M. Camby
(74) *Attorney, Agent, or Firm*—Crowell & Moring LLP

(57) ABSTRACT

A method of guiding a multitrack vehicle on a curved path which is defined by the vehicle driver by way of a set steering angle or the like, a curved-path signal representing this desired curved path being guided in a form appropriately revised by an electronic control unit to a steering actuator influencing the steering angle of at least one steerable vehicle wheel is provided. The curved-path signal formed of the set steering angle and of the vehicle speed and, in particular, representing the yaw rate can be used in the sense of a pilot control not only for the appropriate controlling of the steering actuator but also for the appropriate change of the longitudinal force at the wheels of at least one vehicle side, so that, in addition to or instead of the setting of the steering angle, in addition or by itself, a longitudinal force can be applied to at least one vehicle wheel in order to travel the desired curved path. Preferably, the yawing moment fraction, which can be produced by the steering angle, and the yawing moment fraction, which can be produced by the application of a longitudinal force in the form of a braking force and/or a driving force, can be changed in a mutually opposite manner.

5 Claims, 3 Drawing Sheets

FOREIGN PATENT DOCUMENTS

Figure 1:
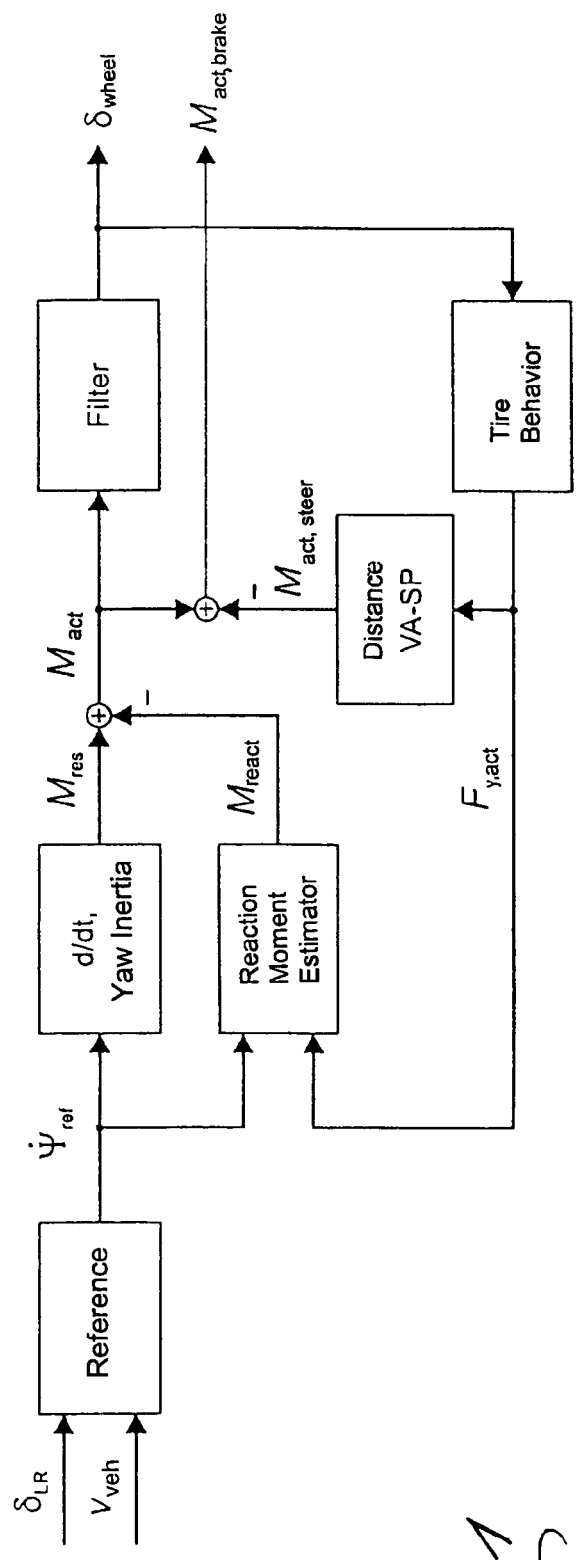

| | | |
|---|---|---|
| DE | 44 19 520 A1 | 12/1994 |
| DE | 195 15 054 A1 | 5/1996 |
| DE | 195 15 055 A1 | 5/1996 |
| DE | 197 51 125 A1 | 9/1998 |
| DE | 196 50 691 C2 | 10/1998 |
| DE | 198 12 238 A1 | 9/1999 |
| DE | 199 36 786 A1 | 11/2000 |
| DE | 100 35 180 A1 | 6/2001 |
| DE | 100 61 075 A1 | 7/2002 |
| DE | 101 02 002 A1 | 7/2002 |
| EP | 0 473 112 A3 | 3/1992 |

\* cited by examiner

METHOD FOR GUIDING A MULTITRACK VEHICLE ON A CURVED PATH

Continuation of prior PCT application No: PCT/EP03/07309, filed 8 Jul. 2003.

The present application claims the benefit of priority under 35 U.S.C. § 120 to International Application No. PCT/EP2003/007309, filed on Jul. 8, 2003, and under 35 U.S.C. § 119 to German Application No. DE 102 36 734.5, filed Aug. 9, 2002, the entire disclosure of the aforementioned documents are herein expressly incorporated by reference.

BACKGROUND AND SUMMARY OF THE INVENTION

The invention relates to a method of guiding a multitrack vehicle on a curved path which is defined by the vehicle driver by way of a set steering angle or the like, a curved-path signal representing this desired curved path being guided in a form appropriately revised by an electronic control unit to an actuator influencing the yawing motion of the vehicle. Specifically, the invention relates to a method of guiding a multitrack vehicle on a curved path which is defined by the vehicle driver by way of a set steering angle or the like, a curved-path signal representing this desired curved path being guided in a form appropriately revised by an electronic control unit to a steering actuator influencing the steering angle of at least one steerable vehicle wheel. With respect to the technical background, the interested reader can refer to German Patent Document DE 198 12 238 A1 and German Patent Document DE 197 51 125 A1.

So-called active steering systems for motor vehicles are being developed or are partially already in production which are capable of actively representing, in addition to the steering angle set by the driver by way of the steering wheel (or generally, a so-called steering handle), an additional steering angle at the steerable vehicle wheels (these are normally the front wheels), whereby an additional side force on the vehicle front axle and thus a desired yawing moment can be generated. Such systems are therefore capable of considerably influencing the driving dynamics of a motor vehicle. Such active steering systems may, for example, be a so-called steer-by-wire system or a superimposed steering, which is also known to a person skilled in the art, and by means of which an additional steering angle is mechanically added to the so-called set steering angle of the driver, so that a resulting cumulative steering angle is set at the steerable vehicle wheel.

By means of a so-called active steering system, it becomes possible to implement measures by means of which noticeable improvements of the vehicle driving behavior can be achieved on the basis of the possibility of active steering interventions. In this case, measures or methods are particularly desirable by means of which the dynamic steering response behavior can be improved in that a basically existing phase delay in the transmission between the driver's steering input (for example, at the steering wheel) and the resulting yawing reaction of the vehicle can be reduced.

One possibility in this respect is represented by the principle of the so-called derivative action steering, which is mentioned, for example, in the aforementioned German Patent Document DE 197 51 125 A1, and which is a controlled steering intervention in which a generated additional steering angle is proportional to the steering wheel rotational speed, thus to the time-differentiated set steering angle of the driver. Specifically, the measured set steering angle can be filtered by a simple PD derivative action member and, according to a given steering ratio, can be additionally set at the steerable wheels. The derivative action with respect to the steering angle by the PD derivative action member causes a smaller phase delay in the transmission between the steering input at the steering wheel and the yawing reaction of the vehicle and in this manner ensures a faster response of the vehicle movement to a steering input by the driver.

Another possible method of improving the steering response behavior on motor vehicles consists of a so-called model-based pilot control of the yaw rate. In this case, a so-called reference yaw rate is first determined from the set steering angle, from the vehicle driving speed and from a vehicle reference model and, by means of an inverse vehicle model, a corresponding steering angle for the steerable wheels is determined therefrom and is then appropriately set at these. In the case of a good match between the vehicle model used as the basis and the real vehicle, the thus calculated steering angle provides the desired yawing motion of the vehicle; that is, the actual yaw rate corresponds to the so-called reference yaw rate. By the corresponding selection of the reference model, in this manner, the transmission between the steering input at the steering wheel and the yawing reaction of the vehicle can be adjusted in a targeted fashion, and particularly an improvement of the steering response behavior can be achieved.

The two known methods described above form a so-called pilot control and, in addition to the set steering angle, (i.e., the steering wheel angle defined by the driver), and the actual vehicle driving speed, require no additional information on the momentary vehicle movement. To this extent, a considerable difference exists between such a pilot control and a known control method, as it is described, for example, in the aforementioned German Patent Document DE 198 12 238 A1. In the case of this control method or similar known control methods, a control deviation is derived from the determinable difference between the actual value of the yaw rate and an appropriately determined desired yaw rate value. This control deviation can then be fed for the purpose of a minimization to, for example, two control units which operate independently of one another, i.e., a steering control unit and a braking control unit. Thus, in contrast to a pilot control, in the case of the last-mentioned control method, the actual yaw rate of the vehicle is measured and is adapted to the desired yaw rate, in which case, this desired yaw rate can be maintained by interventions into the vehicle steering system as well as by interventions into the vehicle braking system. Therefore, by an additional steering or braking, a reaction can take place to a deviation between the actually travelled curved path and the desired curved path, which deviation results from some type of influence.

The present invention concerns no control method by which a variance comparison (for example, with respect to the yaw rate) is carried out, but—similarly to the above-mentioned derivative-action steering—it relates to a method for the pilot control only from the two basic input quantities, specifically the so-called "set steering angle" and the "vehicle speed". Exemplary embodiments of the present invention provide a method with clearly larger freedoms than in the case of the known derivative-action steering. For example, in the case of the known derivative-action steering, system limits exist which are defined by the steering actuating system, for example, with respect to the bandwidth or the regulating speed.

The solution to this task is characterized in that the curved-path signal formed of the set steering angle and of the vehicle speed and, in particular, representing the yaw rate, can be used in the sense of a pilot control for the appropriate change of the longitudinal force at the wheels of at least one vehicle side, so that, in addition to or instead of the setting of the steering angle, in addition or by itself, a longitudinal force can be applied to at least one vehicle wheel in order to travel the desired curved path.

When—as initially indicated—the curved-path signal representing the desired curved path is guided in a form appropriately revised by an electronic control unit to a steering actuator influencing the steering angle of at least one steerable vehicle wheel, the curved-path signal formed of the set steering angle and of the vehicle speed and representing particularly the yaw rate can be used in the sense of a pilot control not only for the appropriate controlling of the steering actuator but also for the appropriate changing of the longitudinal force at the wheels of at least one vehicle side, so that, in addition to, or instead of, the setting of a steering angle, in addition or by itself, a longitudinal force can be applied to at least one vehicle wheel in order to travel the desired curved path.

In accordance with one aspect of the present invention, the above-mentioned longitudinal force is generated by applying a braking force to the wheel or wheels of one vehicle side. However, it is also conceivable to let a driving force act on one side, or to combine the two above-mentioned longitudinal forces with one another such that the wheels are braked on one vehicle side and are accelerated on the other vehicle side. Therefore, for reasons of simplicity, in the following, the application of a longitudinal force is equated with the application of a braking force. This means that, even if in the following only a braking force is mentioned with respect to a vehicle wheel, instead of this braking force, an appropriately large driving force can be applied to a vehicle wheel on the opposite vehicle side, in order to achieve a resulting comparable yawing moment.

According to the invention, a pilot control method is disclosed which permits an improvement of the vehicle handling, or of a yawing motion of the vehicle, by means of integrated or generally combined steering interventions and braking interventions. As result of the targeted braking of individual wheels, an additional yawing motion can be applied to the vehicle which boosts a steering operation. In this manner, even when system limits, for example, of the steering actuating system have been reached, additional improvements of the steering response behavior can be achieved. A method is therefore disclosed for improving the steering behavior, optionally by means of a steering intervention or by means of a braking intervention, or by means of a combined steering intervention and braking intervention, which is a pure yaw rate pilot control requiring only the steering wheel angle (or the like) and the driving speed of the vehicle as input signals. In this case, an arbitrary distribution of the regulating interventions into the steering system and into the braking system of the vehicle can take place. Here, it may also be provided that only the vehicle braking system is appropriately controlled, whereby a steering of the vehicle with a pure braking intervention at individual wheels is permitted, without any locking of the steerable vehicle wheels.

Basically, a first yawing moment fraction can be achieved by the steering angle of the steerable vehicle wheels, and a second yawing moment fraction can be produced by the application of a longitudinal force in the form of a braking force (and/or of a driving force). These two yawing moment fractions cumulatively then result in the yawing moment which is required for the successful and agile traveling of the desired curved path, at least when no significant disturbing influences are present. This last-mentioned yawing moment formed of the sum of the two yawing moment fractions, in the following, will be called an actuator yawing moment, which is to be appropriately applied, and, for the purpose of a pilot control, in the absence of disturbing influences, can be determined solely from the set steering angle and the actual vehicle driving speed.

In this case, the determination of the so-called actuator yawing moment to be applied for the successful traveling of the desired curved path can take place, for example or preferably, by means of a linear single-track model, in which case the actual lateral force of the steerable wheel/wheels resulting from the set steering angle should be returned in order to be able to also take into account the so-called reaction moment of the vehicle. As known, the above-mentioned actuator yawing moment is obtained from the desired yaw rate which—as mentioned above—is determined only from the set steering angle and the vehicle driving speed while taking into account the yaw inertia of the vehicle and its reaction moment, which actuator yawing moment now has to be applied to the vehicle by means of one or several actuators, so that this vehicle moves at the desired yaw rate.

As mentioned above, the division of the actuator yawing moment then taking place according to the invention into a yawing moment fraction, which can be produced by setting a steering angle, and into a yawing moment fraction which can be produced by applying a longitudinal force, can be freely selectable, in which case one of the fractions can also assume the "zero" value. This above-mentioned distribution to a steering actuator and a braking actuator respectively can also take place in a variable manner as a function of marginal conditions. In particular, in this case, the operating speed of the driver's steering handle, that is, the rotational speed of the steering wheel, can be taken into account. In addition, a characteristic-diagram-controlled distribution, for example, by using the vehicle driving speed as a basis, is conceivable. Moreover, a setting limitation of a used actuator, particularly of the steering actuator, can also be taken into account as a marginal condition or influencing variable, as well as the dynamic behavior of the actuator or of the respective concerned actuators. Furthermore, in the event of a system failure, for example, of the steering actuator, the vehicle can still be steered, specifically solely by means of braking interventions.

In a preferred embodiment of the invention, the yawing movement fraction produced by the setting of a steering angle is obtained from a low-pass filtering of the actuator yawing moment to be totally applied for the traveling of the desired curved path. Such a low-pass filtering results in particularly agile dynamics of the vehicle movement because then the "fast" fractions from the desired yaw rate can be converted by almost delay-free braking interventions, while the "slower" fractions are implemented by way of the steering angle of the steerable vehicle wheels. This has the advantage that the respective braking interventions also only have a very short duration and thus lead to no significant deceleration of the vehicle. However, the response behavior upon a steering intention by the driver will then be very fast—as desired.

It is explicitly pointed out that, instead of the yaw rate, also the so-called sideslip angle or the lateral acceleration of the vehicle can be used as the so-called curved-path signal representing the desired curved path. As known, during a progressive vehicle movement without any significant disturbing influences, the relationship $a_y = v \cdot (\dot{\beta} + \dot{\psi})$ applies, if $a_y$ is the lateral acceleration; v is the driving speed of the vehicle; $\beta$ is the sideslip angle; and $\dot{\psi}$ is the yaw rate.

Returning to the division of the actuator yawing moment into a first yawing moment fraction which can be produced by a steering angle and into a second yawing moment fraction which can be produced by the application of a braking force or a longitudinal force, a curved-path signal can now be defined or will be defined, in addition to the yaw rate signal ($\dot{\psi}$), which curved-path signal represents the sideslip angle $\beta$ or the lateral acceleration $a_y$ of the vehicle, the corresponding values being appropriately defined. Thus, a resulting lateral force is then defined, so that the steering locking angle is thereby fixed.

It should also explicitly be pointed out that a steering locking angle at the steerable vehicle wheels can be set not only by means of an actuator but, as in the case of conventional steering systems, also solely virtually manually by the driver of the vehicle. Thus, in addition to the set steering angle and the vehicle speed, from which the so-called curved-path signal is obtained preferably in the form of a yaw rate, the steering angle of the steerable vehicle wheels (or of the steerable vehicle wheel) is also defined. Here, the method according to the invention can also be used because, parallel to the manual steering angle mechanically transmitted or generated corresponding to the steering angle set by the driver, another yawing moment can be produced by way of a longitudinal force applied at least to one vehicle wheel, in which case this additional yawing moment is derived for the purpose of a pilot control solely from the set steering angle and the vehicle speed.

BRIEF DESCRIPTION OF THE DRAWING FIGURES

In the following, the invention will be further explained by means of three block diagrams representing preferred embodiments.

In the embodiment according to FIG. 1, the above-explained so-called actuator yawing moment is subjected to a low-pass filtering in order to determine therefrom the yawing moment fraction to be produced by setting a steering angle.

Figure 2:
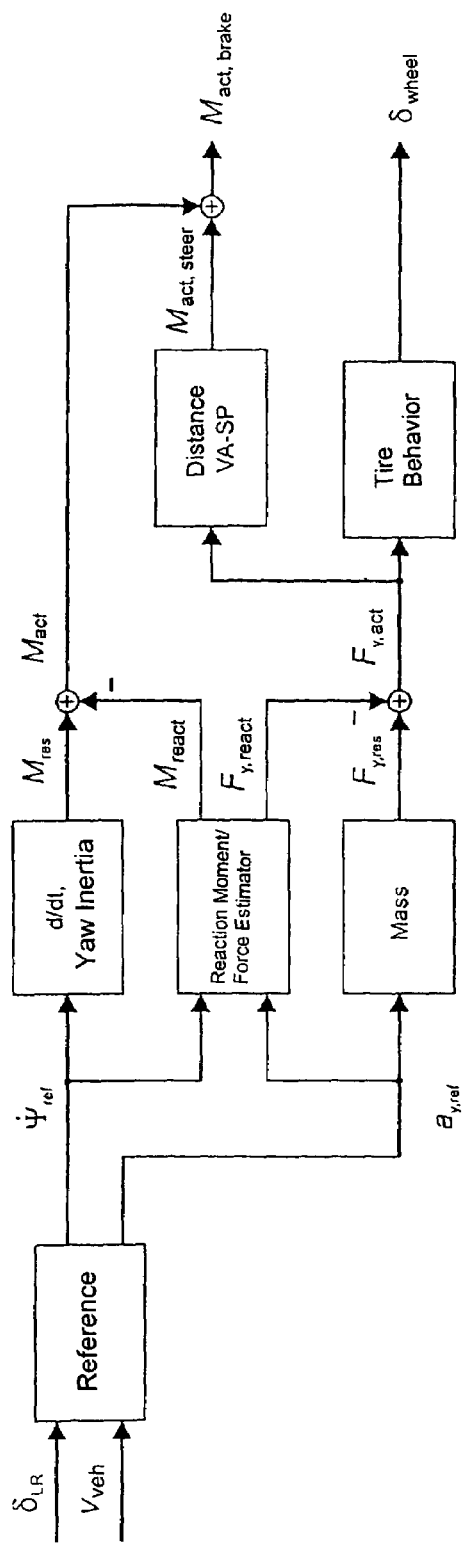

In FIG. 2, the last-mentioned yawing moment fraction is determined by defining the yaw rate as well as the lateral acceleration of the vehicle.

Figure 3:
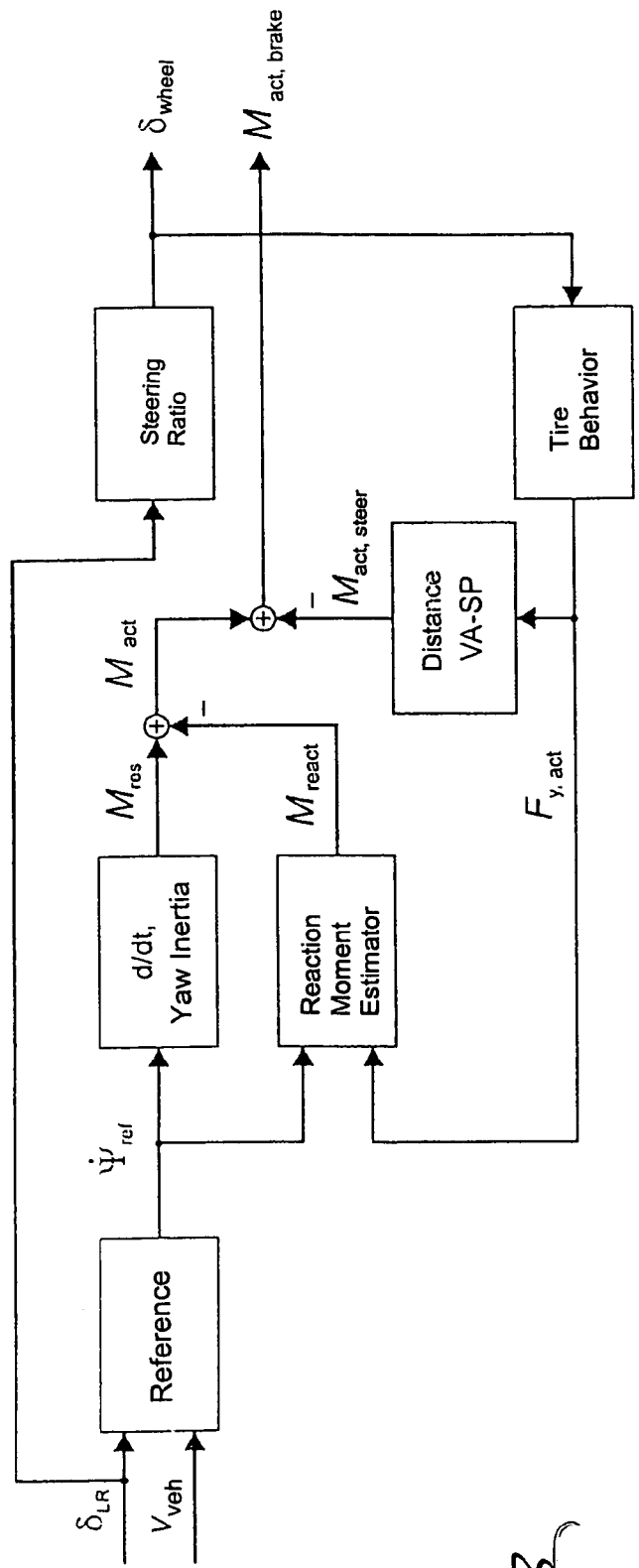

The variant according to FIG. 3 shows a conventional steering system, in which case the steering angle of the steerable vehicle wheels is set directly corresponding to the steering angle set by the driver, specifically preferably with a direct mechanical transmission, so that, in addition (for example) to the yaw rate, the steering angle is defined.

DETAILED DESCRIPTION

These block diagrams (FIGS. 1, 2, 3) represent the computing sequences of a suitable electronic control unit, in which case generally the following symbols indicate the following, parameters.

$\delta_{LR}$ is the so-called set steering angle, i.e, the driver's steering intention which he can set particularly at a steering wheel.

$V_{veh}$ indicates the vehicle speed, that is, the actual driving or longitudinal speed of the vehicle.

By way of a so-called "reference", preferably a suitable reference model, a curved-path signal representing the desired curved path is obtained from the set steering angle $\delta_{LR}$ and the vehicle speed $V_{veh}$.

$\dot{\psi}_{ref}$ indicates the virtually defined yaw rate of the vehicle which is obtained as the so-called curved-path signal representing the desired curved path from the steering angle $\delta_{LR}$ set by the driver and the actual driving speed $V_{veh}$ of the vehicle.

$a_{y,ref}$ indicates the possibly defined lateral acceleration of the vehicle which is also obtained from the "reference" as a curved-path signal representing the desired curved path.

$M_{res}$ indicates a so-called resulting yawing moment which has to be present for the vehicle to move at the yaw rate $\dot{\psi}_{ref}$. This resulting yawing moment $M_{res}$ is obtained by way of the angular momentum principle from the yaw moment of inertia of the vehicle (in the figures, indicated by the time differential "d/dt yaw inertia").

$M_{react}$ indicates the so-called reaction moment of the vehicle, that, among others, can be determined from the defined yaw rate $\dot{\psi}_{ref}$ in a reaction moment estimator, and which results from a cornering of the vehicle during which the steerable wheels are not locked and in which no additional longitudinal force acts upon the wheels; that is, that the vehicle wheels are not braked or accelerated.

$M_{act}$ indicates the so-called actuator yawing moment which has to be applied to the vehicle by means of suitable actuators, so that the yaw rate $\dot{\psi}_{ref}$ acts upon the vehicle. As known, this actuator yawing moment $M_{act}$ is the difference between the resulting yawing moment $M_{res}$ and the reaction moment $M_{react}$.

$\delta_{wheel}$ indicates the steering angle of a steering wheel. This steering angle $\delta_{wheel}$ causes a (first) yawing moment fraction $M_{act,steer}$ which, by way of the tire behavior as well as by way of the distance between the vehicle front axle (VA), which carries the steerable vehicle wheels, and the vehicle center of gravity (SP), is in a direct relationship with the steering angle $\delta_{wheel}$.

In addition to the first yawing moment fraction $M_{act,steer}$, according to the invention, another (second) yawing moment fraction $M_{act,brake}$ exists which can be produced by applying a longitudinal force, particularly a braking force, to at least one wheel of a vehicle side.

According to the invention, the actuator yawing moment $M_{act}$ to be applied is now virtually divided into a yawing moment fraction $M_{act,steer}$, which can be produced by a steering angle $\delta_{wheel}$, and into a yawing moment fraction $M_{act,brake}$ which can be produced by the application of a longitudinal force in the form of a braking force and/or a driving force. Specifically, the two yawing moment fractions $M_{act,steer}$ and $M_{act,brake}$ form the sum of the entire actuator yawing moment $M_{act}$.

$F_{y,act}$ indicates the side force generated by the steering of the steerable vehicle wheels which, by way of the tire behavior, is in a direct relationship with the steering angle $\delta_{wheel}$.

$F_{y,react}$ indicates the reaction side force which can be determined by means of a reaction moment/force estimator from a defined lateral acceleration $a_{y,ref}$.

In addition, there is a direct relationship between a possibly defined lateral acceleration $a_{y,ref}$ and a resulting side force $F_{y,res}$, specifically by way of the mass of the vehicle.

In the embodiment or the block diagram according to FIG. 1, in which only one yaw rate $\dot{\psi}_{ref}$ is defined as the curved path signal representing the desired curved path, the actuator yawing moment $M_{act}$, which can be determined as described above, is now guided over a filter, specifically a low-pass filter, from which the steering angle $\delta_{wheel}$ can now be directly obtained. This steering angle $\delta_{wheel}$ is set by a suitable actuator, in which case this actuator can either be a component of a steer-by-wire system or a component of a superimposed steering, as initially described.

As explained above, from this steering angle $\delta_{wheel}$, the yawing moment fraction $M_{act,steer}$ produced thereby can be defined, since the additional yawing moment fraction $M_{act,brake}$ to be produced by applying a longitudinal force is directly obtained therefrom. This is then converted by means of a suitable actuator; that is, the wheel brakes of the vehicle are preferably operated appropriately on one side.

In addition, the side force $F_{y,act}$ caused by the steering angle $\delta_{wheel}$ should be taken into account in the above-mentioned reaction moment estimator.

In the embodiment or the block diagram according to FIG. 2, in which, in addition to a yaw rate $\dot{\psi}_{ref}$ as a curved-path signal representing the desired curved path, a desired lateral acceleration $a_{y,ref}$ is defined, from this desired lateral acceleration $a_{y,ref}$ a side force $F_{y,res}$ is now first defined which corresponds to the latter, from which side force $F_{y,res}$ the reaction side force $F_{y,react}$ is subtracted which is defined in the above-mentioned estimator, in order to obtain a side force $F_{y,act}$ which can be produced by means of a suitable steering actuator. Not only the required steering angle $\delta_{wheel}$ can then be defined in the described manner from this side force $F_{y,act}$, but also the resulting yawing moment fraction $M_{act,steer}$.

When this yawing moment fraction $M_{act,steer}$ resulting from the steering is subtracted from the also known—since it was, after all, defined by the vehicle driver by way of the set steering angle $\delta_{LR}$ while taking into account the actual driving speed $V_{veh}$—actuator yawing moment $M_{act}$, the additional yawing moment fraction $M_{act,brake}$ is, in turn, obtained which is to be produced by the application of a longitudinal force. This yawing moment fraction $M_{act,brake}$ is then implemented by means of a suitable actuator; that is, the wheel brakes of the vehicle are preferably operated in an appropriate manner on one side.

The embodiment according to FIG. 3 is a vehicle with a conventional steering system, in which case the steering angle $\delta_{wheel}$ of the steerable vehicle wheels is set directly corresponding to the steering angle $\delta_{LR}$ set by the driver, preferably with a direct mechanical transmission with a suitable ratio (called "steering ratio"), so that, in addition to the yaw rate $\dot{\psi}_{ref}$, the steering angle $\delta_{wheel}$ is defined. From the latter, (analogously to FIG. 1), the resulting yawing moment fraction $M_{act,steer}$ can then be defined which subsequently is to be subtracted from the defined actuator yawing moment $M_{act}$ in order to obtain the yawing moment fraction $M_{act,brake}$ to be produced by the application of a longitudinal force.

The significant advantage of the introduced method, which is implemented in all embodiments, of a so-called yaw rate pilot control with an integrated or combined steering intervention and braking intervention is that, in comparison to a pilot control with a sole steering intervention, the steering response behavior can be significantly improved by additional braking interventions at individual wheels. Another advantage (at least in the variants according to FIGS. 1, 2) is the possibility of an arbitrary distribution of the active regulating interventions to the steering system and the braking system of the vehicle. As a result of this virtually additional degree of freedom, it is, for example, conceivable to easily implement a so-called "steer-by-brake functionality" by which a desired yawing motion of the vehicle can be set by pure braking interventions at individual wheels. Such a "steer-by-brake functionality" advantageously makes it possible to maintain the steerability of the vehicle, for example, in the event of a complete failure of the steering actuating system. In this context, it should also be pointed out that a large number of details can also have a construction which deviates from the above embodiments without departing the content of the claims.

While the invention has been described in connection with various embodiments, it will be understood that the invention is capable of further modifications. This application is intended to cover any variations, uses or adaptations of the invention following, in general, the principles of the invention, and including such departures from the present disclosure as known, within the known and customary practice within the art to which the invention pertains.

The invention claimed is:

1. Method of guiding a multitrack vehicle on a curved path which is defined by a vehicle driver by way of a set steering angle, the curved-path signal representing a desired curved path being guided in a form revised by an electronic control unit to at least one actuator influencing a yawing motion of the vehicle, and the curved-path signal formed of the set steering angle and of the vehicle speed, representing the yaw rate, are used as a pilot control for controlling a steering actuator which sets a steering angle of at least one steerable vehicle wheel, and for the change of the longitudinal force at the wheels of at least one vehicle side, so that, in addition to, or instead of, the setting of the steering angle, in addition, or by itself, a longitudinal force is applied to at least one vehicle wheel in order to travel the desired curved path, wherein a yawing moment fraction, which is produced by the steering angle and another yawing moment fraction, which is produced by the application of a longitudinal force in the form of a braking force and/or a driving force, are changeable in a mutually opposite manner, a sum of the yawing moment fraction and the another yawing moment fraction being an actuator yawing moment which is applied for travelling of the desired curved path, and a division of the actuator yawing moment into the yawing moment fraction is variable or freely selectable as a function of marginal conditions.

2. Method according to claim 1, wherein, in addition to the or instead of the yaw rate signal, a curved path signal is defined which represents a sideslip angle or a lateral acceleration of the vehicle.

3. Method of guiding a multitrack vehicle on a curved path which is defined by the vehicle driver by way of a set steering angle, the curved-path signal representing a desired curved path being guided in a form revised by an electronic control unit to at least one actuator influencing a yawing motion of the vehicle, and the curved-path signal formed of the set steering angle and of a vehicle speed and representing a yaw rate, can be used as a pilot control for controlling a steering actuator, which sets a steering angle of at least one steerable vehicle wheel, and for the change of the longitudinal force at the wheels of at least one vehicle side, so that, in addition to, or instead, of the setting of the steering angle, in addition, or by itself, a longitudinal force is applied to at least one vehicle wheel in order to travel the desired curved path, wherein a yawing moment fraction produced by setting of a steering angle is obtained from a low-pass filtering of an actuator yawing moment to be applied, a sum of the yawing moment fraction, which is produced by the steering angle and a yawing moment fraction, which is produced by the application of a longitudinal force in the form of a braking force and/or a driving force, being the actuator yawing moment to be applied for the traveling of the desired curved path.

4. Method according to claim 1, wherein the actuator yawing moment to be applied for traveling of the desired curved path is determined from a linear single-track model, into which an actual side force of the steerable wheel or wheels resulting from the set steering angle is returned.

5. Method according to claim 3, wherein the actuator yawing moment to be applied for traveling of the desired curved path is determined from a linear single-track model, into which an actual side force of the steerable wheel or wheels resulting from the set steering angle is returned.

* * * * *